(12) United States Patent
Iisaka et al.

(10) Patent No.: US 7,088,347 B2
(45) Date of Patent: Aug. 8, 2006

(54) COORDINATE INPUT DEVICE DETECTING TOUCH ON BOARD ASSOCIATED WITH LIQUID CRYSTAL DISPLAY, AND ELECTRONIC DEVICE THEREFOR

(75) Inventors: Hidehito Iisaka, Shiojiri (JP); Hidefumi Sakata, Tatsuno-cho (JP)

(73) Assignee: Seiko Epson Corporation, Tokyo (JP)

( * ) Notice: Subject to any disclaimer, the term of this patent is extended or adjusted under 35 U.S.C. 154(b) by 346 days.

(21) Appl. No.: 10/097,355

(22) Filed: Mar. 15, 2002

(65) Prior Publication Data
US 2002/0135570 A1    Sep. 26, 2002

(30) Foreign Application Priority Data
Mar. 23, 2001  (JP) .............................. 2001-086156
Feb. 8, 2002  (JP) .............................. 2002-032928

(51) Int. Cl.
*G09G 5/00* (2006.01)
*G08C 21/00* (2006.01)

(52) U.S. Cl. ................ 345/177; 178/18.01; 178/18.03; 178/18.04; 178/19.02

(58) Field of Classification Search ........ 345/173–179; 178/18.01–18.07, 19.01–19.06
See application file for complete search history.

(56) References Cited

U.S. PATENT DOCUMENTS

| | | | | |
|---|---|---|---|---|
| 5,231,381 A | * | 7/1993 | Duwaer | 345/174 |
| 5,402,151 A | * | 3/1995 | Duwaer | 345/173 |
| 5,484,967 A | * | 1/1996 | Yanagisawa et al. | 178/18.04 |
| 5,570,299 A | * | 10/1996 | Tokioka et al. | 702/150 |
| 5,644,653 A | * | 7/1997 | Sunakawa et al. | 382/187 |
| 5,761,087 A | * | 6/1998 | Yoshimura et al. | 702/56 |
| 5,990,720 A | * | 11/1999 | Tokioka et al. | 327/253 |

FOREIGN PATENT DOCUMENTS

JP    A 8-297534    11/1996

* cited by examiner

*Primary Examiner*—Vijay Shankar
(74) *Attorney, Agent, or Firm*—Oliff & Berridge, PLC

(57) ABSTRACT

A coordinate input device is associated with a liquid crystal display to detect a touch or contact thereon. A transparent board is arranged on the screen of the display to provide a coordinate input surface having a substantially rectangular shape. At least one vibration detector (e.g., a microphone or piezoelectric element) is attached onto the board to detect vibration or sound that occurs when a position input member is brought into contact with the coordinate input surface at an arbitrary input position. The input position is represented as one-dimensional coordinate based on outputs of two vibration detectors, or it is represented as two-dimensional coordinates based on outputs of three vibration detectors. Thus, the manually designated input position is detected and is electronically displayed on the screen of the display. As the position input member, it is possible to use a pen, a fingernail, etc.

11 Claims, 12 Drawing Sheets

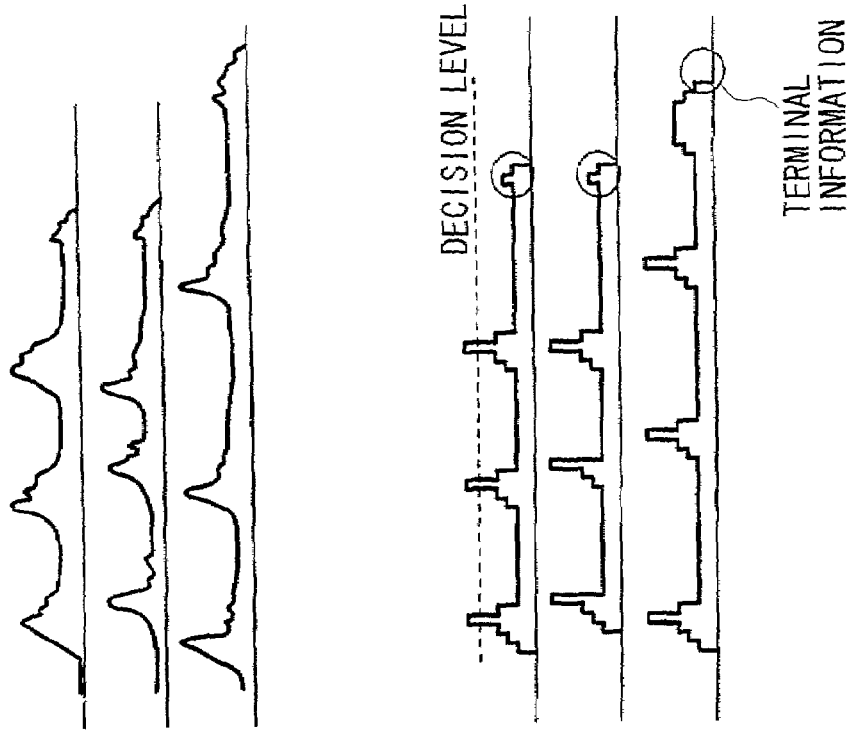

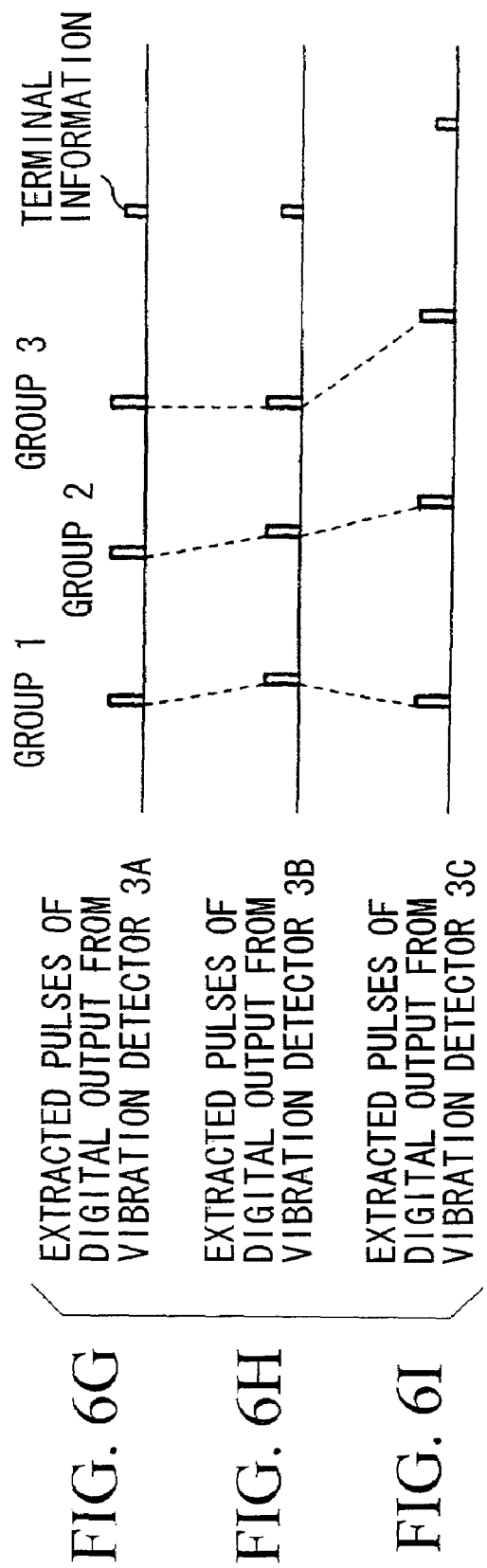

COORDINATE INPUT DEVICE DETECTING TOUCH ON BOARD ASSOCIATED WITH LIQUID CRYSTAL DISPLAY, AND ELECTRONIC DEVICE THEREFOR

BACKGROUND OF THE INVENTION

1. Field of the Invention

This invention relates to coordinate input devices such as touch keys that detect input positions manually designated on boards or panels associated with liquid crystal displays, so that corresponding coordinates are produced and input to electronic devices.

2. Description of the Related Art

Liquid crystal displays are widely used for a variety of small-size portable electronic devices such as digital clocks, watches, calculators, electronic pocketbooks, and PDA (abbreviation for 'Personal Digital Assistant') devices. A typical example of the small-size portable electronic device provides a liquid crystal display that has a touch panel function allowing entry of data and switching of functions by detecting touch or contact thereon. For example, the liquid crystal display is capable of displaying various pieces of information representing calendars, schedules, directories, addresses, and residences, which should be adequately managed on the screen thereof In addition, it also displays function buttons or areas, which are used to switch over functions when operated. That is, when a user or human operator touches the prescribed function area with his/her finger or an electronic pen on the screen, the electronic device changes the images on the screen in accordance with the designated function. Some electronic devices also allow entry of handwritten letters or pictures on the screen. This type of the portable electronic device provides a specifically designed liquid crystal display that has touch keys attached onto its panel surface or substrate, wherein these touch keys act as switches for changing over functions or input devices for inputting coordinates.

Conventionally, various types (of coordinate input devices such as touch keys were actually produced for practical uses. That is, the coordinate input devices were designed based on the resistance film method, electrostatic capacitance method, ultrasonic method, and the like. In the case of the coordinate input device of the ultrasonic method, for example, the user holds a position input member such as an electronic pen incorporating a vibration generator, and brings it in contact with a board or substrate. The board provides vibration detectors such as piezoelectric elements, which detect vibration propagating thereto from the position input member whose tip is brought in contact with the prescribed position. Thus, the coordinate input device estimates the 'contact' position (representing coordinates, etc.) based on the vibration propagating time.

The coordinate input device of the resistance film method provides a relatively low transmittance, which may deteriorate visibility of the display device. The coordinate input device of the electrostatic capacitance method requires an electronic pen specially designed for designation of coordinates. In addition, both the resistance film method and electrostatic capacitance method basically require electrodes for the purpose of detection of electric current and capacitance. Therefore, the coordinate input devices of these methods are complicated in manufacturing processes. Further, the coordinate input device of the ultrasonic method also requires a specially designed electronic pen incorporating a vibrator for generating vibration.

SUMMARY OF THE INVENTION

It is an object of the invention to provide a coordinate input device that does not require a special device (e.g., an electronic pen) for inputting coordinates and is easy to operate with a simple configuration, and that is particularly suitable for assisting operations and functions on the screen of a liquid crystal display, which may be provided for a small-size portable electronic device.

A coordinate input device of this invention is associated with a liquid crystal display to detect a touch or contact thereon. That is, a transparent board is arranged on the screen of the display to provide a coordinate input surface substantially having a rectangular shape. At least one vibration detector (e.g., microphone or piezoelectric element) is attached onto the board in proximity to the prescribed corner of the coordinate input surface. When a user of an electronic device incorporating the coordinate input device brings a position input member such as a pen or fingernail into contact with the coordinate input surface of the board at an arbitrary input position, vibration occurs due to an impact therebetween and is detected by two vibration detectors, which in turn output analog vibration detection signals. The analog vibration detection signals are supplied to A/D converters via buffer amplifiers, wherein they are subjected to analog-to-digital conversion to produce digital vibration detection signals. Then, prescribed calculations are performed based on the time difference, which is detected between the digital vibration detection signals, to specify the input position on the board as one-dimensional coordinate. Alternatively, it is possible to provide three vibration detectors respectively attached to different positions in proximity to prescribed corners of the coordinate input surface of the board. In this case, the input position is specified as two-dimensional coordinates. The coordinate information is processed by the CPU to control the display by means of the display controller. Thus, the input position manually designated by the position input member of the user is detected and is electronically displayed on the screen of the display.

BRIEF DESCRIPTION OF THE DRAWINGS

These and other objects, aspects, and embodiments of the present invention will be described in more detail with reference to the following drawing figures, in which:

FIG. 6A shows a waveform of an analog vibration detection signal output from a vibration detector 3A;

FIG. 6B shows a waveform of an analog vibration detection signal output from a vibration detector 3B;

FIG. 6C shows a waveform of an analog vibration detection signal output from a vibration detector 3C;

FIG. 6D shows a waveform of a four-valued digital vibration detection signal relative to the vibration detector 3A;

FIG. 6E shows a waveform of a four-valued digital vibration detection signal relative to the vibration detector 3B;

FIG. 6F shows a waveform of a four-valued digital vibration detection signal relative to the vibration detector 3C;

FIG. 6G shows a series of pulses that are extracted from the digital vibration detection signal shown in FIG. 6D;

FIG. 6H shows a series of pulses that are extracted from the digital vibration detection signal shown in FIG. 6E;

FIG. 6I shows a series of pulses that are extracted from the digital vibration detection signal shown in FIG. 6F;

DESCRIPTION OF THE PREFERRED EMBODIMENTS

This invention will be described in further detail by way of examples with reference to the accompanying drawings.

First Embodiment

Figure 1:
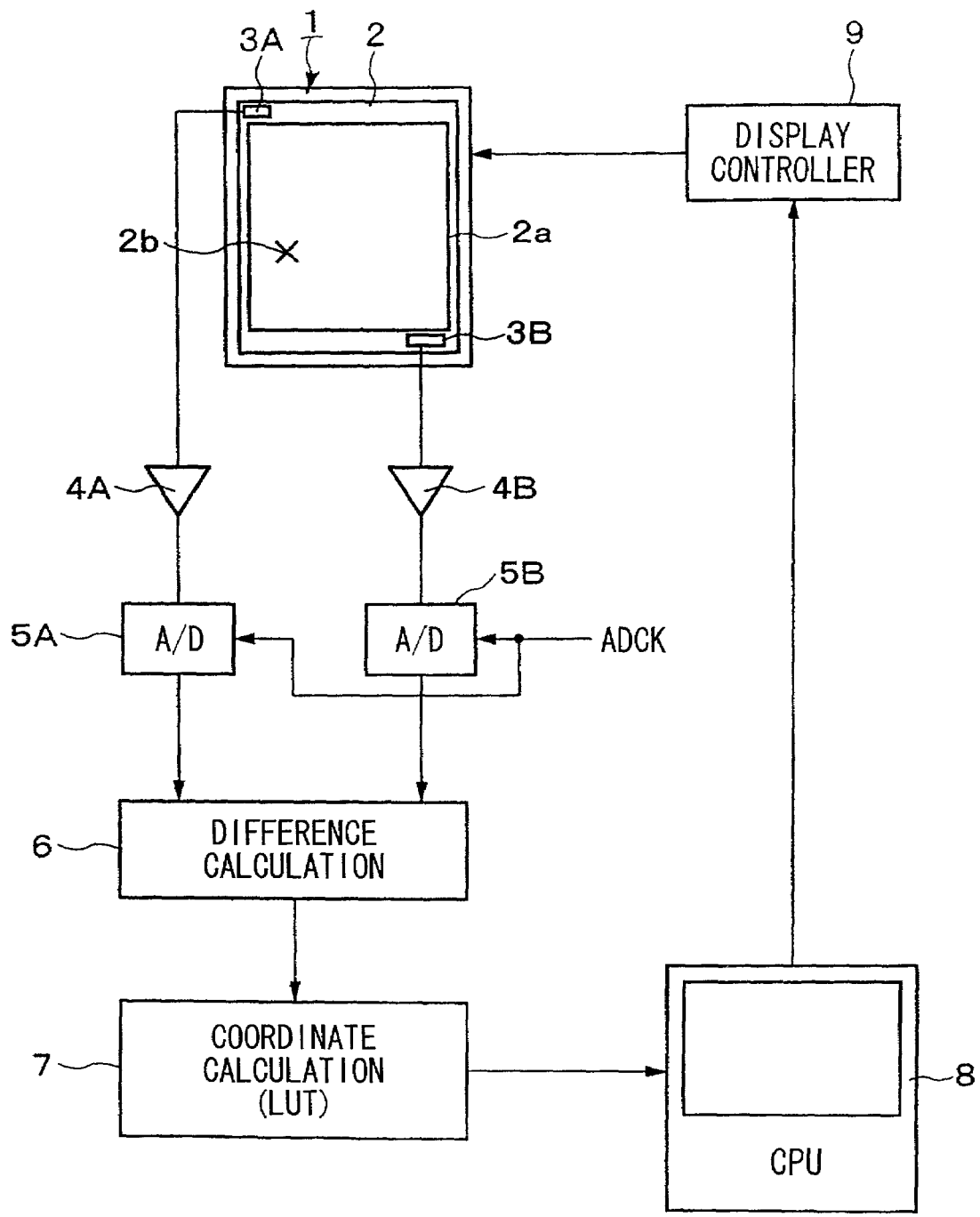
FIG. 1 is a block diagram showing a display system using a coordinate input device in accordance with a first embodiment of the invention.

FIG. 1 shows an overall display system using a coordinate input device in accordance with a first embodiment of the invention. Herein, a display 1 provides a board (or substrate) 2 on the surface thereof Preferably, the board 2 is made of relatively hard materials having transparency such as the glass, and acrylic resin. The board 2 provides a coordinate input surface 2a having substantially a rectangular shape. Vibration detectors 3A and 3B are respectively attached to diagonally opposite positions of the coordinate input surface 2a. The vibration detectors 3A and 3B are composed of piezoelectric elements, for example. Alternatively, it is possible to use microphones for the vibration detectors 3A and 3B.

In the present embodiment, when a pen tip or a fingernail (hereinafter, simply referred to as a position input member) having a relatively high hardness is brought in contact with an arbitrarily designated input position 2b on the coordinate input surface 2a, a small impact occurs to cause vibration (or sound) on the board 2. Thus, the vibration detectors 3A and 3B detect the vibration caused by a contact between the position input member and the coordinate input surface 2a.

As the vibration that occurs and is detected on the board 2, there are provided three factors as follows:

(i) Vibration that propagates through the board 2;

(ii) Surface acoustic waves that propagate on the surface of the board 2; and (iii) Sound waves that occur by the contact and propagates into the air.

A decision whether to use any one of the aforementioned factors of the vibration depends on the material of the board 2, and on the type of the detector. Therefore, the present embodiment does not require an electrode and an electronic pen having a special structure incorporating a vibrator, which was conventionally required.

The vibration detectors 3A and 3B detect and convert the vibration to electric signals called analog vibration detection signals, which are respectively forwarded to analog-to-digital (A/D) converters 5A and 5B via buffer amplifiers 4A and 4B. The A/D converters 5A and 5B operate based on an analog-to-digital conversion clock signal ADCK having a prescribed frequency; hence, they convert the analog vibration detection signals to 1-bit digital vibration detection signals respectively. As the frequency of the aforementioned clock signal ADCK becomes higher, a detection precision correspondingly becomes higher. A difference calculation block 6 inputs 1-bit digital vibration detection signals respectively output from the AID converters 5A and 5B. Hence, the difference calculation block 6 calculates a time difference between the two digital vibration detection signals. Based on the calculated time difference, a coordinate calculation block 7 produces a one-dimensional coordinate with respect to the input position 2b on the coordinate input surface 2. Herein, the coordinate calculation block 7 performs prescribed calculations to produce the one-dimensional coordinate for the input position 2b. Alternatively, it uses a lookup table LUT describing the prescribed relationship between time differences and coordinates in determination of the one-dimensional coordinate for the input position 2b.

The one-dimensional coordinate produced by the coordinate calculation block 7 is supplied to a CPU 8 wherein it is subjected to prescribed processing. Thus, the CPU 8 produces a processed signal based on the one-dimensional coordinate of the input position 2b. The processed signal is supplied to a display controller 9 wherein it is converted to a display signal of a prescribed format, which is then supplied to the display 1. Thus, the display 1 shows the input position 2b in the form of the one-dimensional coordinate on the screen thereof. The user of the display system is able to see the displayed position through the transparent board 2.

Second Embodiment

Figure 2:
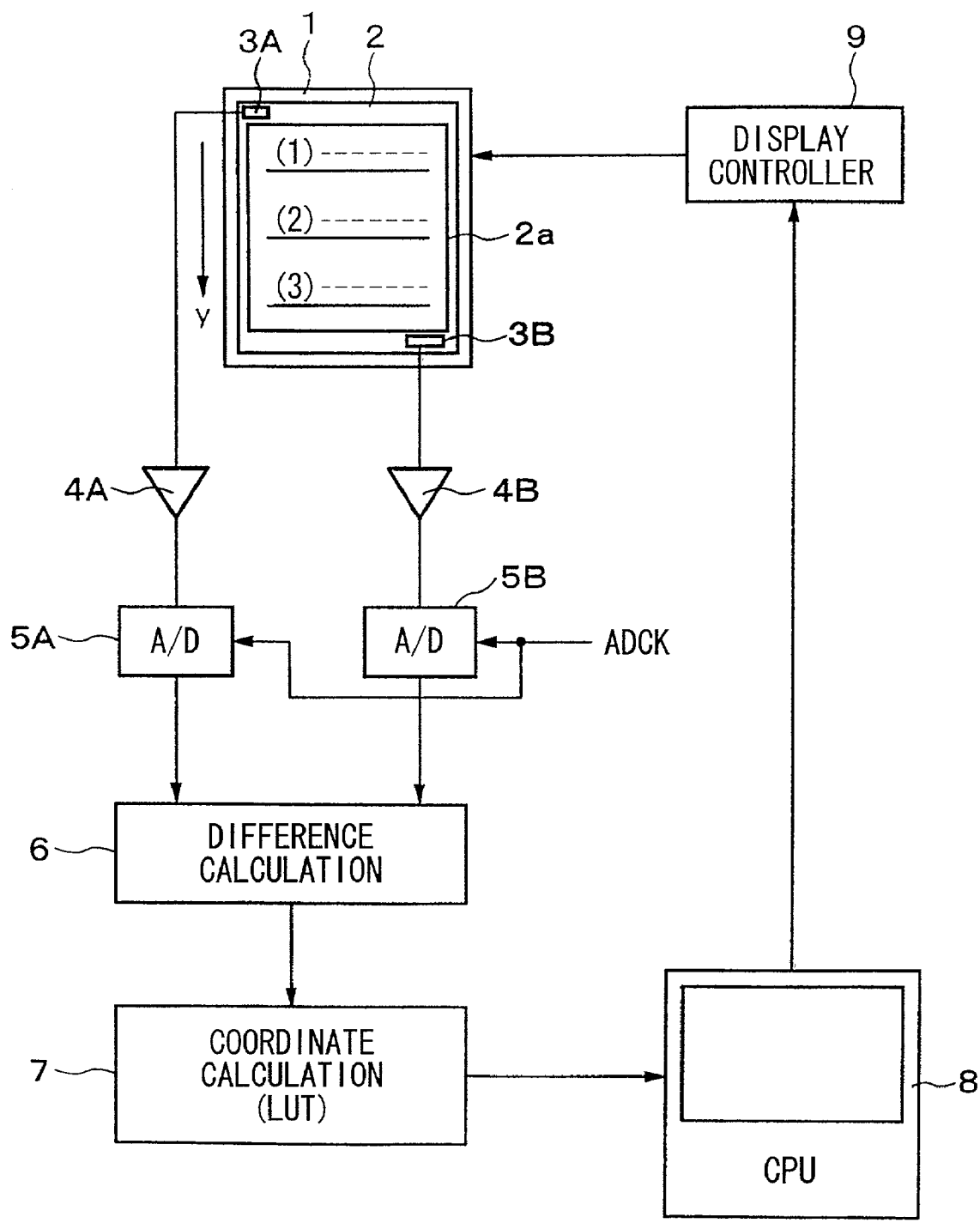
FIG. 2 is a block diagram showing a display system using a coordinate input device in accordance with a second embodiment of the invention.

FIG. 2 shows an overall display system using a coordinate input device in accordance with a second embodiment of the invention, which is a partial modification of the foregoing first embodiment, wherein parts identical to those shown in FIG. 1 are designated by the same reference numerals. The second embodiment is characterized in that the coordinate input surface 2a of the board 2 of the display 1 shows selection items (1), (2), and (3) which are vertically arranged in a y-axis direction. Therefore, the display 1 allows the user to select any one of the three items on the screen of the display 1.

Figure 3:
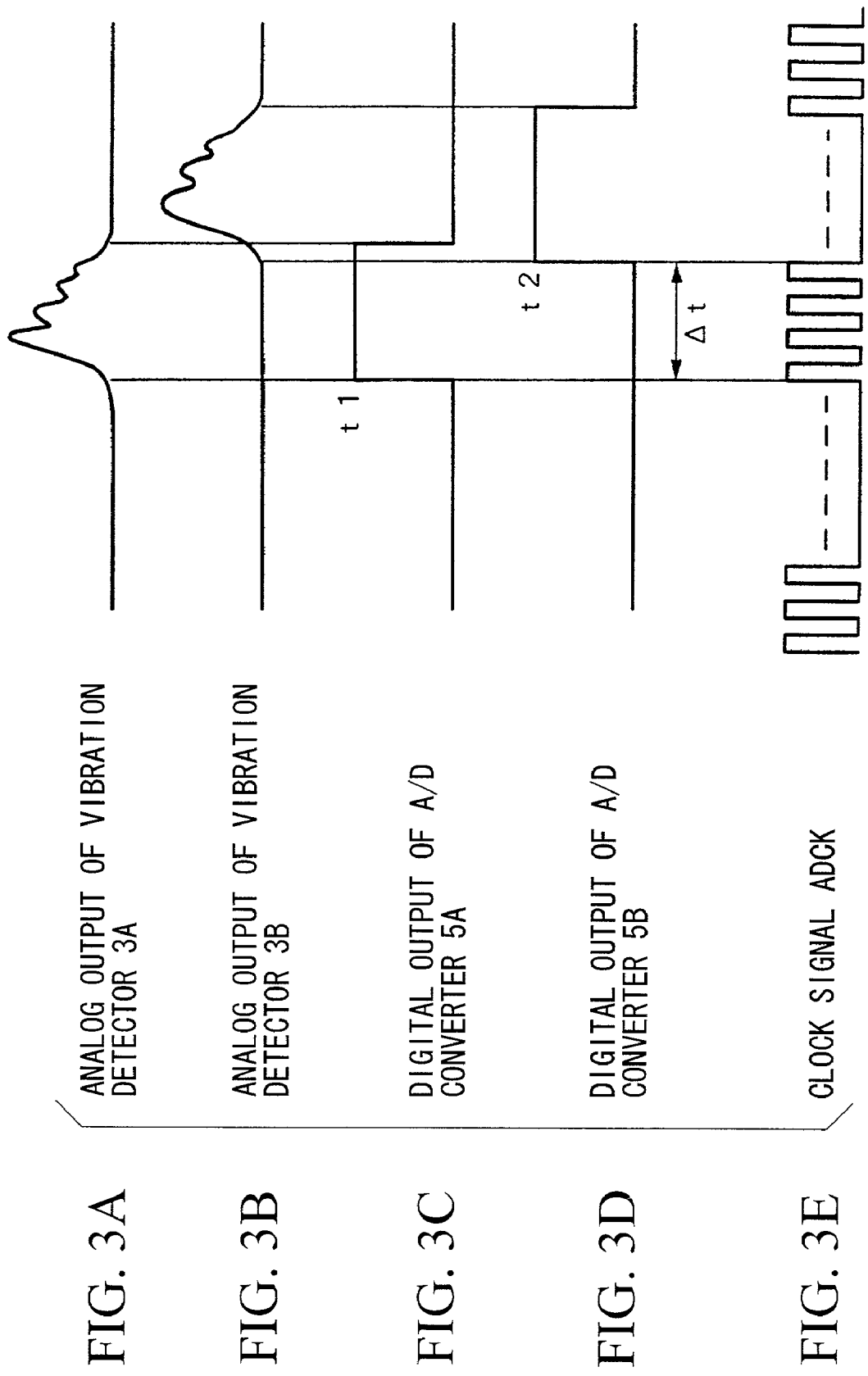
FIG. 3A shows a waveform of an analog vibration detection signal output from a vibration detector 3A.
FIG. 3B shows a waveform of an analog vibration detection signal output from a vibration detector 3B.
FIG. 3C shows a pulse of a 1-bit digital vibration detection signal output from an A/D converter 5A.
FIG. 3D shows a pulse of a 1-bit digital vibration detection signal output from an A/D converter 5B.
FIG. 3E shows pulses of an analog-to-digital conversion clock signal ADCK.

The user brings a position input member such as a pen tip in contact with a display area corresponding to one of three items (1), (2), and (3) on the coordinate input surface 2a. By the contact between the position input member and the coordinate input surface 2a, a vibration occurs and is detected by the vibration detectors 3A and 3B. Thus, the vibration detectors 3A and 3B convert the vibration to electric signals called analog vibration detection signals, which are shown in FIGS. 3A and 3B. These analog vibration detection signals are forwarded to the A/D converters 5A and 5B via the buffer amplifiers 4A and 4B, wherein they are converted to 1-bit digital vibration detection signals which are shown FIGS. 3C and 3D. Herein, each of the digital vibration detection signals consists of a pulse. That is, the 1-bit output of the A/D converter 5A consists of a pulse whose leading-edge time is t1, and the 1-bit output of the A/D converter 5B consists of a pulse whose leading-edge time is t2. The difference calculation block 6 produces a time difference $\Delta t$ (=t1−t2) based on the leading-edge times t1 and t2 of the outputs of the A/D converters 5A and 5B. Based on the time difference $\Delta t$, the coordinate calculation block 7 performs prescribed calculations to produce a position of the vibration (i.e., input position). Alternatively, it uses a lookup table LUT to determine the input position. Thus, the coordinate calculation block 7 produces one-dimensional coordinate information with respect to the y-axis direction.

As shown in FIG. 3E, the clock signal ADCK consists of pulses, which periodically occur over time. The aforementioned time difference $\Delta t$ is given as the number of pulses of the clock signal ADCK. Therefore, one of the three items designated by the user is detected based on the number of clock pulses counted in the time difference $\Delta t$. Examples will be described below.

$-1 \leq \Delta t \leq 1$ . . . center position (designating the item (2))

$-4 \leq \Delta t \leq -2$ . . . upper position (designating the item (1))

$2 \leq \Delta t \leq 4$ . . . lower position (designating the item (3))

The CPU 8 performs prescribed processes in detection and display of the item designated by the user on the coordinate input surface 2b. For example, when the time difference $\Delta t$=t1−t2 belongs to a range between −1 and 1, the CPU 8 determines that the user designates the item (2) displayed at the center position of the coordinate input surface 2b. Under the control of the CPU 8, the display controller 9 controls the display 1 to indicate designation of the item on the screen in a prescribed display manner. For example, the designated item is highlighted by a prescribed color or luminance.

As described above, neither the first nor the second embodiment requires a specially designed position input member such as an electronic pen having a special structure, which was conventionally required. Therefore, a normal pen, ball-point pen, pencil, and fingernail may sufficiently satisfy the function of the position input member, which are used to designate a desired position on the coordinate input surface 2b. In addition, the present embodiments do not require electrodes based on the resistance film method, electrostatic capacitance method, and ultrasonic method, which were required for the conventional coordinate input devices.

Therefore, the present embodiments can provide highly reliable coordinate input devices that are easy to handle in input operation and have simple configurations having compact sizes and sufficient hardness.

In addition, the display 1 is designed to visually display the position of occurrence of vibration on the screen. Hence, the user is capable of reliably inputting a desired position while visually recognizing it through the transparent board 2.

In both the first and second embodiments shown in FIGS. 1 and 2, the difference calculation block 6 is composed of a counter for counting the number of pulses of the clock signal ADCK that may appear in the time difference $\Delta t$. In order to raise the accuracy, it is possible to supply a specific clock signal having a higher frequency to the difference calculation block 6.

Further, the buffer amplifiers 4A and 4B can be partially modified to have gain adjustment functions to ensure adjustment on sensitivities in detection of the vibration and sound. By the provision of the gain adjustment functions for the buffer amplifiers 4A and 4B, it is possible to avoid unintentional operation of the coordinate input device that may occur due to the surrounding sound (or background noise) and unintentional contact in the non-use mode. Incidentally, the coordinate input device can be subjected to initial setting for setting prescribed gains for the buffer amplifiers 4A and 4B. Alternatively, the coordinate input device allows the user to set desired gains in consideration of the use environment or his/her preference. It is also possible to allow automatic and optimum setting for the gains in response to the purpose for using the coordinate input device.

Third Embodiment

Figure 4:
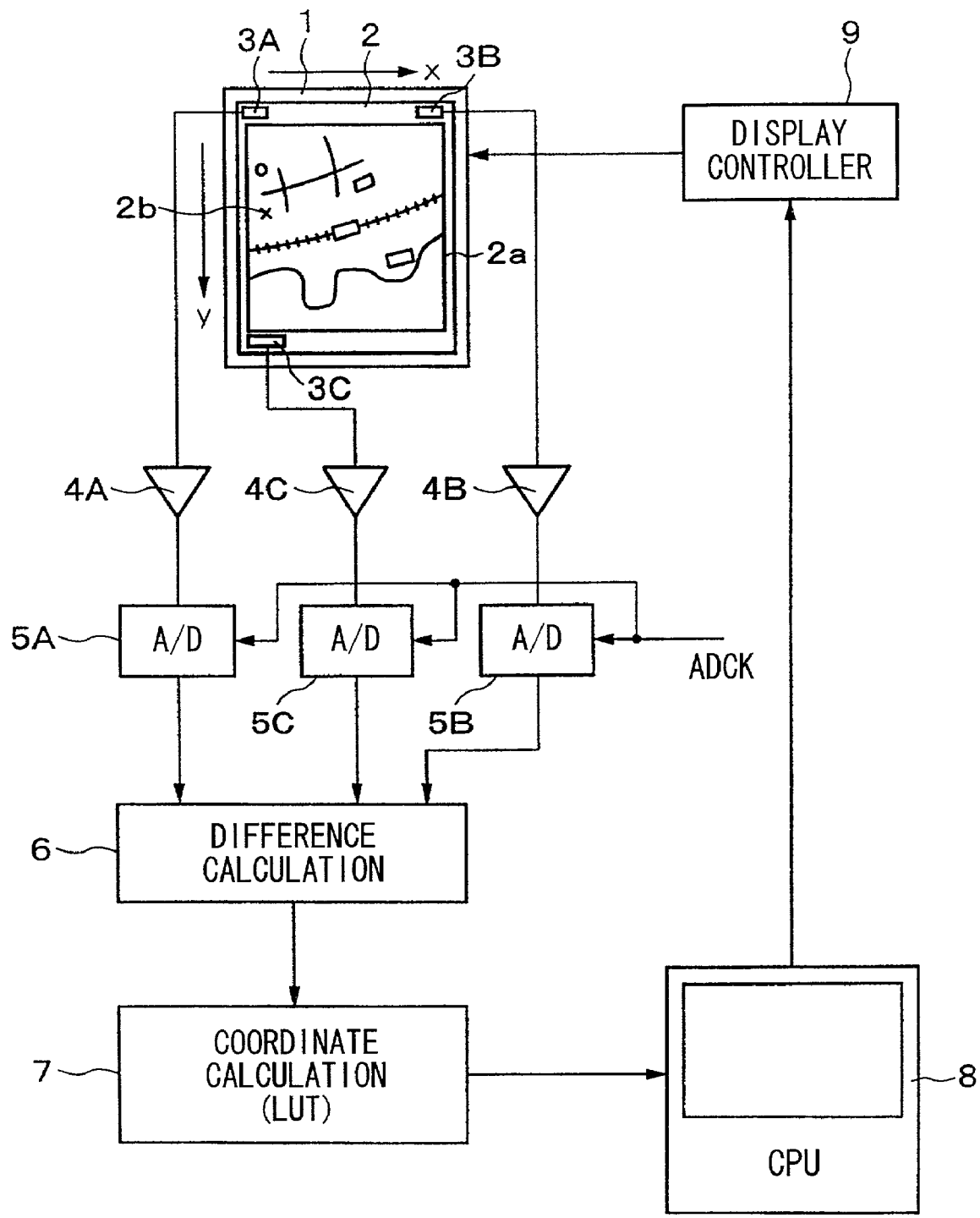
FIG. 4 is a block diagram showing a display system using a coordinate input device in accordance with a third embodiment of the invention.

FIG. 4 shows an overall display system using a coordinate input device in accordance with a third embodiment of the invention, wherein parts identical to those shown in FIGS. 1 and 2 are designated by the same reference numerals.

The third embodiment is characterized in that the display 1 provides three vibration detectors 3A, 3B, and 3C in proximity to three corners of the coordinate input surface 2a having a rectangular shape; therefore, an input position 2b on the coordinate input surface 2a is estimated as two-dimensional coordinates. In the case of FIG. 4, the display 1 shows a map on the screen or on the coordinate input surface 2a. Herein, the user designates a desired point on the map as an input position 2b, according to which two-dimensional coordinates are correspondingly input to the display system. The display system of FIG. 4 also provides three buffer amplifiers 4A, 4B, and 4C, and three A/D converters 5A, 5B, and 5C relative to the three vibration detectors 3A, 3B, and 3C respectively. Herein, a pair of the vibration detectors 3A and 3B are arranged in an x-axis direction, while another pair of the vibration detector 3A and 3C are arranged in a y-axis direction.

When the user holds and brings a position input member in contact with an arbitrary input position 2b on the coordinate input surface 2a, an impact correspondingly occurs so that the three vibration detectors 3A, 3B, and 3C produce three analog vibration detection signals respectively. The three analog vibration detection signals are respectively forwarded to the A/D converters 5A, 5B, and 5C via the buffer amplifiers 4A, 4B, and 4C, wherein they are subjected to analog-to-digital conversion to produce three digital vibration detection signals. Among them, two digital vibration detection signals respectively output from the two vibration detectors 3A and 3B, which belong to the x-axis direction of the coordinate input surface 2a, are selected for difference calculations performed in the difference calculation block 6. That is, the difference calculation block 6 calculates a time difference between leading-edge times of pulses corresponding to the two digital vibration detection signals respectively output from the two vibration detectors 3A and 3B. Then, it produces one-dimensional coordinate information based on the time difference with respect to the vibration occurrence position (i.e., input position 2*b*) on the coordinate input surface 2*a* in the x-axis direction.

The difference calculation block 6 also calculates a time difference between leading-edge times of pulses corresponding to the two digital vibration detection signals respectively output from the two vibration detectors 3A and 3C, which belong to the y-axis direction of the coordinate input surface 2*a*. Then, it produces another one-dimensional coordinate information based on the time difference with respect to the vibration occurrence position on the coordinate input surface 2*a* in the y-axis direction. Based on the one-dimensional coordinate information that is produced with respect to the x-axis direction and another one-dimensional coordinate information that is produced with respect to the y-axis direction, it is possible to specify the vibration occurrence position (i.e., input position 2*b*) on the board 2 as two-dimensional coordinates.

In the third embodiment similar to the foregoing first and second embodiments, the buffer amplifiers 4A, 4B, and 4C can be partially modified to have gain adjustment functions to ensure adjustment on sensitivities in detection of the vibration and sound. By the provision of the gain adjustment functions for the buffer amplifiers 4A, 4B, and 4C, it is possible to avoid unintentional operation of the coordinate input device that may occur due to the surrounding sound (or background noise) and unintentional contact in the non-use mode. Incidentally, the coordinate input device can be subjected to initial setting for setting prescribed gains for the buffer amplifiers 4A, 4B, and 4C. Alternatively, the coordinate input device allows the user to set desired gains in consideration of the use environment or his/her preference. It is also possible to allow automatic and optimum setting for the gains in response to the purpose for using the coordinate input device.

Fourth Embodiment

Figure 5:
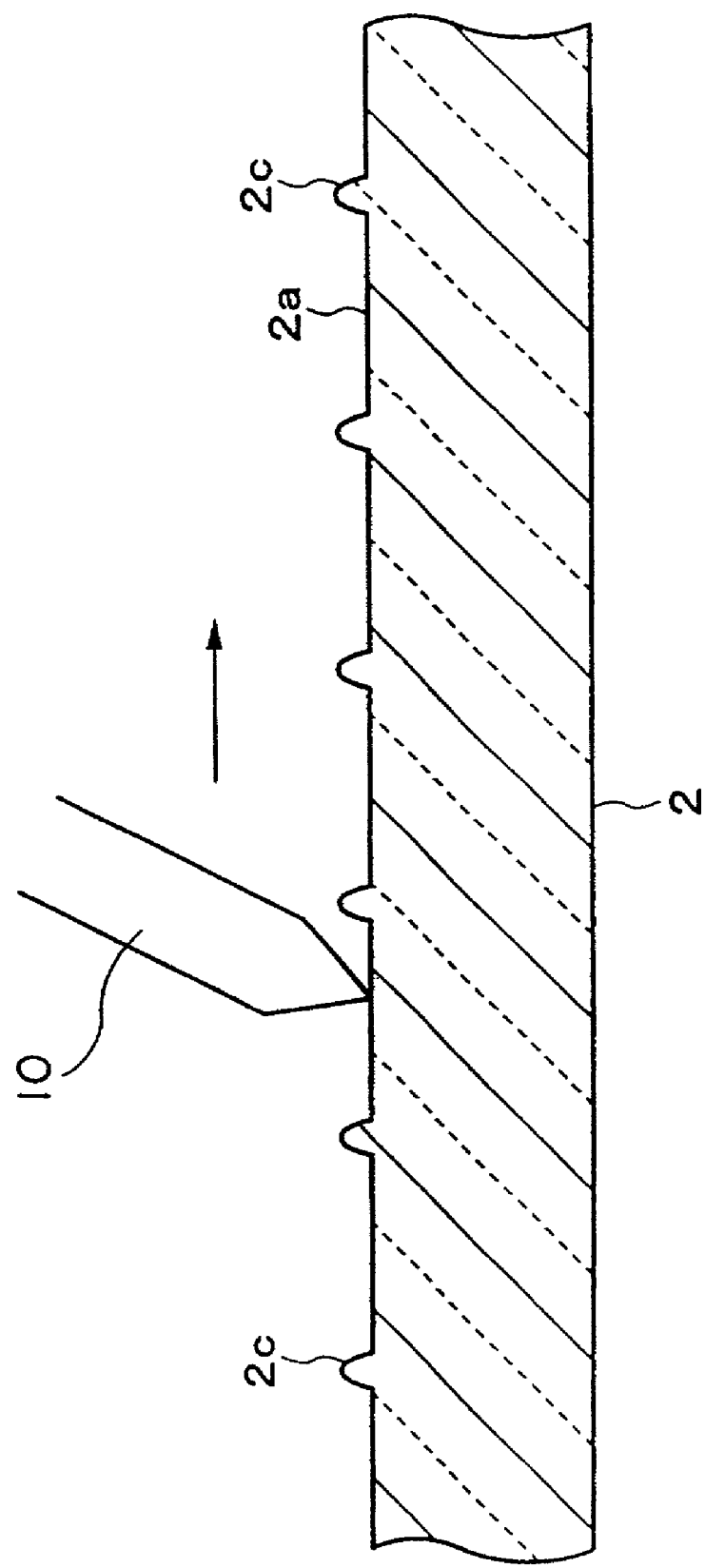
FIG. 5 is a cross-sectional view showing a structure of a board that is used for a coordinate input device in accordance with a fourth embodiment of the invention.

FIG. 5 is a cross-sectional view showing a structure of a board 2 that is used in a coordinate input device in accordance with a fourth embodiment of the invention. That is, the fourth embodiment is basically similar to the third embodiment, whereas the board 2 is partially modified in structure compared to the foregoing board that is used in the third embodiment.

The board 2 shown in FIG. 5 has a coordinate input surface 2*a* on which plural projections 2*c* are arranged. Similar to the third embodiment shown in FIG. 4, the board 2 shown in FIG. 5 provides three vibration detectors 3A, 3B, and 3C (not shown), which are arranged in proximity to three corners of the coordinate input surface 2*a* having a rectangular shape. The aforementioned structure of the board 2 employed in the coordinate input device of the present embodiment allows the user to input characters, figures, curves, etc.

Next, a description will be given with respect to an operation to input a desired curve drawn on the coordinate input surface 2*a* of the board 2 installed in the coordinate input device of the display system in accordance with the fourth embodiment. Compared with the third embodiment shown in FIG. 4, the fourth embodiment is also characterized in that each of the A/D converters 5A, 5B, and 5C is configured as a 2-bit analog-to-digital converter that is capable of producing four-valued signals, for example.

In FIG. 5, when the user holds and moves a position input member 10 (e.g., a pen) in contact with the coordinate input surface 2*a* in the direction of the arrow, the board 2 causes two types of vibrations as follows:
(i) Vibration having a constant magnitude that is caused by the contact between the position input member 10 and the coordinate input surface 2*a*; and
(ii) A series of vibrations that sequentially occur as the position input member 10 sequentially comes in contact with the projections 2*c* as the user moves the position input member 10 on the coordinate input surface 2*a* to draw a desired curve.

Therefore, the board 2 causes a combination of the aforementioned two types of vibrations. As a result, the three vibration detectors 3A, 3B, and 3C outputs respective analog vibration detection signals, which are shown in FIGS. 6A, 6B, and 6C. The three analog vibration detection signals are respectively forwarded to the A/D converters 5A, 5B, and 5C via the buffer amplifiers 4A, 4B, and 4C, wherein they are respectively subjected to 2-bit analog-to-digital conversion to produce four-valued digital vibration detection signals, which are shown in FIGS. 6D, 6E, and 6F.

The present embodiment extracts characteristic waveforms, which are caused by contacts between the projections 2*c* and the position input member 10, from the aforementioned three digital vibration detection signals. That is, it extracts pulses shown in FIGS. 6G to 6I from the digital vibration detection signals shown in FIGS. 6D to 6F. Herein, each of the digital vibration detection signals corresponds to a waveform constituted by various pulses corresponding to four-valued levels, and it is compared with a prescribed decision level (or threshold) to detect peaks. The pulses having the highest level are detected as peaks that appear above the decision level. For example, the four-valued digital vibration detection signal corresponding to the output of the vibration detector 3A shown in FIG. 6D is compared to the prescribed decision level to detect three pulses shown in FIG. 6G as the peaks, which designate sequential contacts that occur when the position input member 10 sequentially comes in contact with three projections 2*c* on the coordinate input surface 2*a*. The remaining waveform portions whose levels are lower than the prescribed decision level may represent continuous contacts between the position input member 10 and the coordinate input surface 2*a*. In addition, the present embodiment also detects two pieces of information representing a start point and an end point between which the position input member 10 continuously moves on the coordinate input surface 2*a* while intermittently coming in contact with the projections 2*c*. In the case of the four-valued digital vibration detection signal shown in FIG. 6D, for example, the last pulse portion is detected as terminal information for the vibration detector 3A, which is shown in FIG. 6G. In other words, the terminal information is produced upon detection of the time at which the vibration detected by the vibration detector disappears. As shown in FIGS. 6G to 6I, different series of pulses are respectively detected with respect to the vibration detectors 3A, 3B, and 3C. That is, the three vibration detector 3A, 3B, and 3C detect three pulses, which differ from each other in time, with respect to the same projection 2*c* that the position input member 10 comes in contact with.

Figure 7:
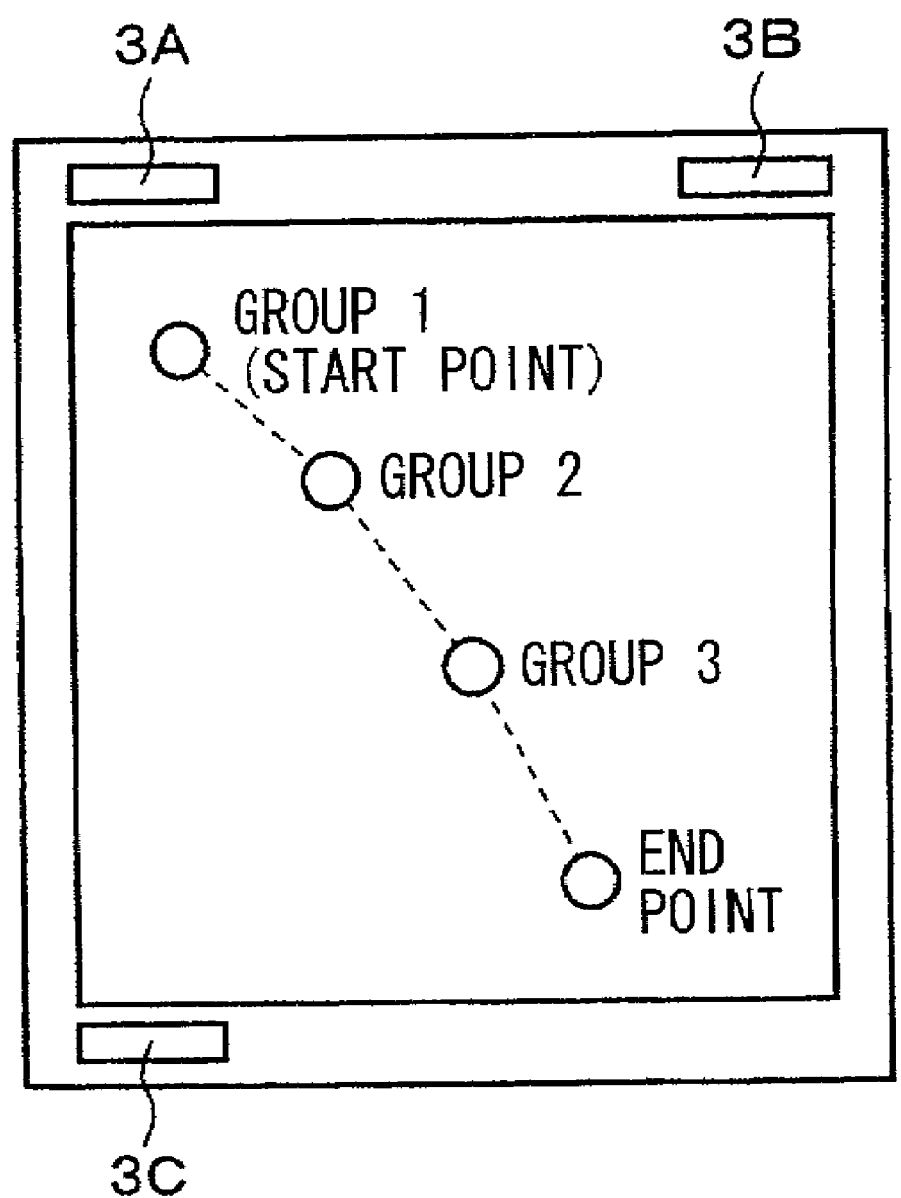
FIG. 7 shows an example of a curve that is drawn on the board of the coordinate input device of the fourth embodiment.

The three series of pulses shown in FIGS. 6G to 6I are divided into three groups (namely, group 1, group 2, and group 3) in consideration of their occurrence times and orders. That is, first pulses are classified as the group 1; second pulses are classified as the group 2; third pulses are classified as the group 3; and last pulses are detected for the terminal information. With respect to each of the three groups of pulses, the foregoing calculations, which were described in the third embodiment, are performed to produce two-dimensional coordinate information with respect to a vibration occurrence position, which corresponds to a projection 2c that the position input member 10 comes in contact with. Therefore, it is possible to specify a vibration occurrence position with respect to each group, which is marked on the screen of the board 2 as shown in FIG. 7. Three vibration occurrence positions are sequentially arranged relative to different times and are calculated with respect to the three groups respectively, so that they are arranged in their time order on the screen of the board 2. Thus, it is possible to determine a track (or locus) along with the position input member 10 such as a pen moves on the coordinate input surface 2a by connecting the vibration occurrence positions, which are arranged on the screen of the board 2. Herein, the track is terminated by an end point that is specified by the terminal information. As described above, the present embodiment allows the user to input characters, figures, curves, etc. into the electronic device, so that the electronic device can display them on the screen.

The present embodiment does not necessarily use the projections 2c formed on the coordinate input surface 2a; hence, it is possible to employ various types of irregularities having various shapes such as embossing and convexities as necessary. In addition, the projections 2c can be arranged in regular patterns or irregularly on the coordinate input surface 2a.

As the position input member 10, it is preferable to use relatively hard and sharp materials such as a pen, ball-point pen, pencil, fingernail, and a stick having a sharpened tip.

Fifth Embodiment

The aforementioned first to fourth embodiments are designed to detect one-dimensional coordinate or two-dimensional coordinates with respect to the vibration occurrence position based on the time difference between leading edges of pulses contained in the digital vibration detection signals. In contrast, the fifth embodiment is designed in such a manner that the analog vibration detection signals produced by the vibration detectors (see FIGS. 3A and 3B, and FIGS. 6A, 6B, and 6C) are subjected to multiple-bit analog-to-digital conversion. That is, fifth embodiment is characterized by producing digital vibration detection signals in response to vibration levels in determination of the vibration occurrence position.

Thus, the fifth embodiment can produce the digital vibration detection signals whose levels designate pressures (namely, write-down pressures) that are applied to the board 2 by the position input member 10. Therefore, the fifth embodiment allows the user to write characters or draw figures and curves in response to the write-down pressures while specifying the vibration occurrence positions on the coordinate input surface 2a of the board 2. For example, it is possible to change the thickness of the line or curve in response to the write-down pressure. Alternatively, it is possible to change shades or colors in response to the write-down pressures.

Sixth Embodiment

Figure 8:
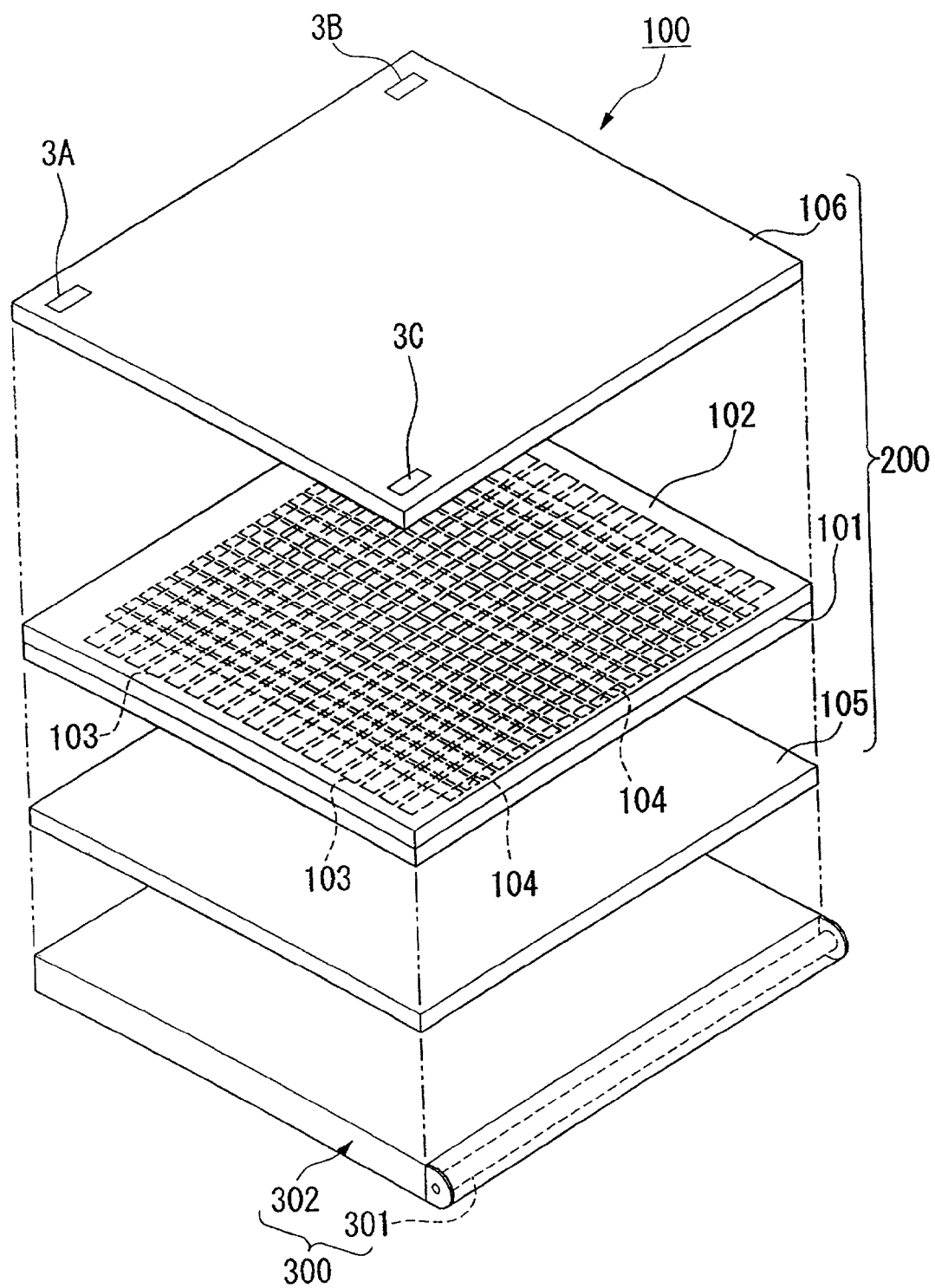
FIG. 8 is an exploded perspective view showing a structure of a passive-matrix liquid crystal display using a coordinate input device in accordance with a sixth embodiment of the invention.

FIG. 8 shows an exploded perspective view of a passive-matrix liquid crystal display 100 of a transparent (or translucent) type, which uses the aforementioned coordinate input device described in conjunction with the foregoing embodiments. The liquid crystal display 100 contains an assembly of a liquid crystal panel 200 and an illumination device (i.e., back light) 300. Herein, the back light 300 is provided in the back (i.e., lower side in FIG. 8) of the liquid crystal panel 200.

The liquid crystal panel 200 contains a liquid crystal layer (not shown) that is narrowly held between a lower substrate 101 and an upper substrate 102, which is arranged opposite to each other. A polarizing plate 105 is arranged between the lower substrate 101 and the illumination device 300; and a polarizing plate 106 is arranged upwardly on the upper substrate 102, which is to be viewed by the user. Numerous signal electrodes 103 are arranged in a stripe manner on the surface of the lower substrate 101 that faces the liquid crystal layer. In addition, numerous signal electrodes 104 are arranged in a stripe manner on the surface of the upper substrate 102, which is arranged opposite to the surface of the lower substrate 101 and faces the liquid crystal layer. Herein, the stripes of the signal electrodes 104 are arranged to rectangularly cross the stripes of the signal electrodes 103 respectively.

The polarizing plate 106 shares the function of the aforementioned board 2 of the coordinate input device. Therefore, the three vibration detectors 3A, 3B, and 3C are arranged at prescribed corners of the polarizing plate 106.

The present embodiment is designed in such a manner that the upper surface of the polarizing plate 106 providing the vibration detectors 3A, 3B, and 3C acts as the coordinate input surface 2a of the board 2. Alternatively, it is possible to provide the vibration detectors on the surface of the glass substrate 102, which in turn acts as the coordinate input surface 2a of the board 2.

Seventh Embodiment

Next, a description will be given with respect to a seventh embodiment of the invention, which is a modification of the aforementioned sixth embodiment shown in FIG. 8. That is, the polarizing plate 106 does not provide the vibration detectors 3A, 3B, and 3C, which are in turn provided on the surface of the board 2. The seventh embodiment is designed in such a manner that the board 2 providing the vibration detectors 3A, 3B, and 3C are arranged on the surface of the polarizing plate 106.

Incidentally, the sixth and seventh embodiments are both described as the passive-matrix liquid crystal display 100 of the transparent type. Of course, it is possible to apply the present invention to other types of liquid crystal displays such as active-matrix liquid crystal displays, which may use two-terminal-type elements such as the TFD (Thin-Film Diode) or three-terminal-type elements such as the TFT (Thin-Film Transistor). In short, the present invention can be applied to any other types of liquid crystal displays, which are of the transparent type, semi-transparent type, and reflection type.

Further, the present invention is not necessarily limited to the liquid crystal displays; hence, it can be applied to any type of display or indicator such as organic electroluminescent (EL) displays, light emitting diodes (LED), cathode-ray tube (CRT) displays, and PDP (or plasma display).

Eighth Embodiment

Figure 9:
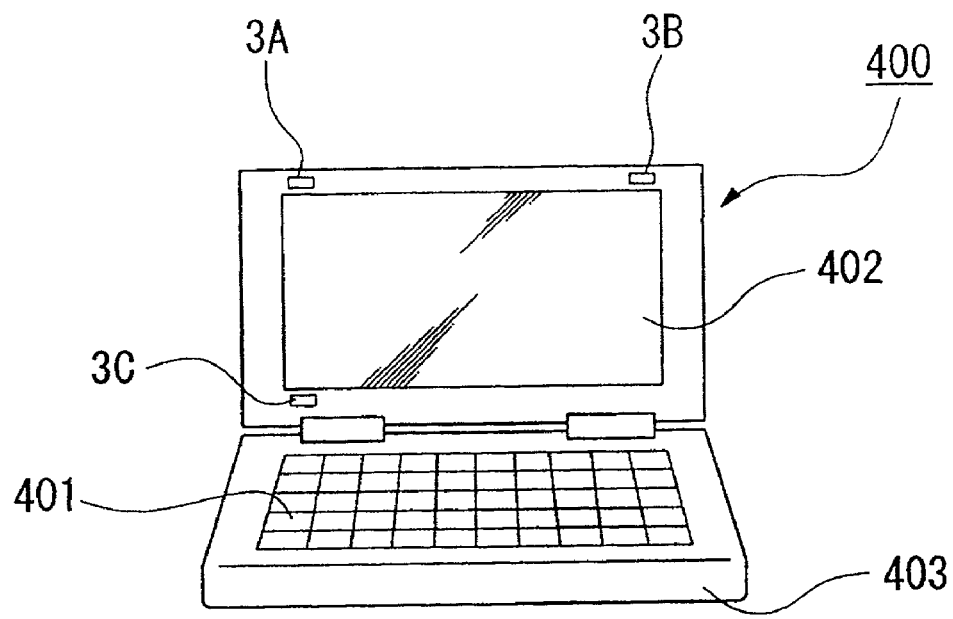
FIG. 9 is a front view showing an appearance of a portable information processing device using a liquid crystal display having a coordinate input function in accordance with an eighth embodiment of the invention.

With reference to FIG. 9, a description will be given with respect to an eighth embodiment of the invention, which is a portable information processing device such as a word processor or personal computer using the aforementioned liquid crystal display of the sixth or seventh embodiment shown in FIG. 8.

That is, a portable information processing device 400 is composed of a keyboard 401, a liquid crystal display 402, and a main body (or casing) 403. The vibration detectors 3A, 3B, and 3C are attached in proximity to the prescribed corners of the screen of the liquid crystal display 402. That is, the portable information processing device 400 incorporates the coordinate input device using the vibration detectors 3A, 3B, and 3C.

Ninth Embodiment

Figure 10:
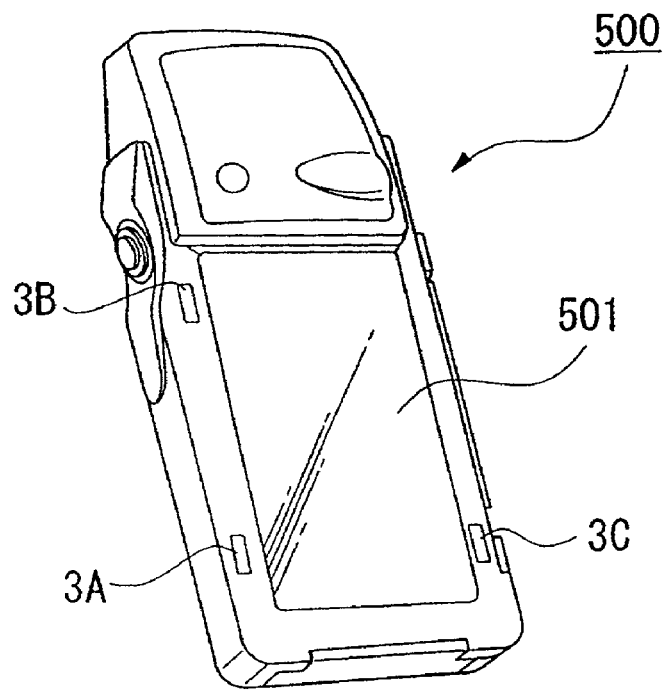
FIG. 10 is a perspective view showing an appearance of a composite-type PDA device using a liquid crystal display having a coordinate input function in accordance with a ninth embodiment of the invention.

With reference to FIG. 10, a description will be given with respect to a ninth embodiment of the invention, which is a composite-type PDA device using the aforementioned liquid crystal display of the seventh embodiment. That is, a PDA device 500 provides the vibration detectors 3A, 3B, and 3C, which are attached to the prescribed corners of a liquid crystal display 501.

Both the aforementioned electronic devices shown in FIGS. 9 and 10 realize coordinate input functions by using the liquid crystal displays with a simple configuration.

Tenth Embodiment

Figure 11:
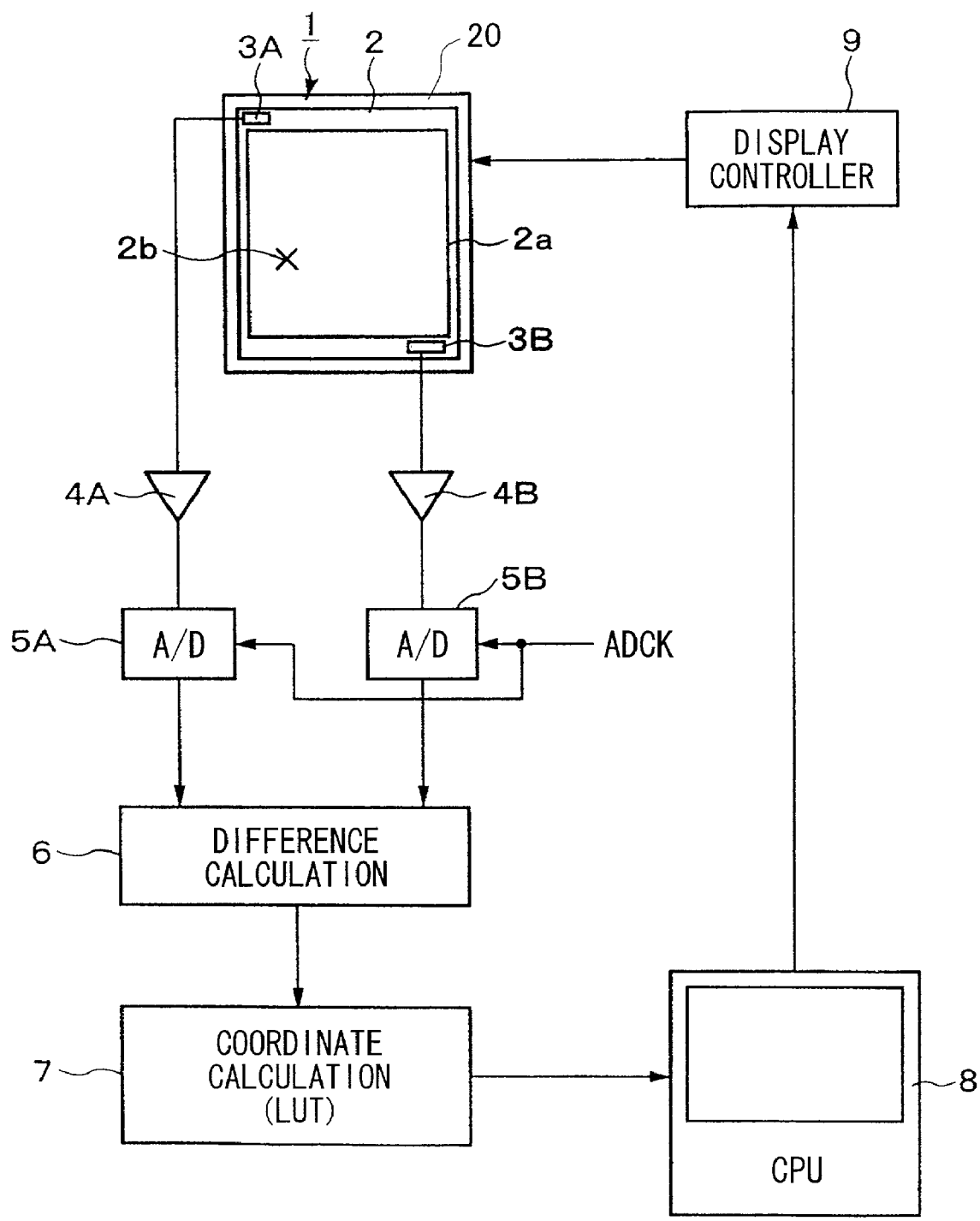
FIG. 11 is a block diagram showing a display system using a coordinate input device in accordance with a tenth embodiment of the invention.

FIG. 11 shows an overall display system using a coordinate input device in accordance with a tenth embodiment of the invention. That is, the tenth embodiment designates a liquid crystal display that is installed in the composite-type PDA device of the ninth embodiment shown in FIG. 10, for example. Similarly to the first embodiment shown in FIG. 1, the display system of the tenth embodiment provides the coordinate input device, wherein parts identical to those shown FIG. 1 are designated by the same reference numerals; hence, the detailed description thereof will be omitted.

The first embodiment shown in FIG. 1 is designed in such a manner that the vibration detectors 3A and 3B are arranged at diagonally opposite corners of the board 2. The tenth embodiment shown in FIG. 11 is characterized in that the board 2 of the display 1 corresponds to an upper glass substrate of a liquid crystal display. That is, an outer frame 20 of the casing of the device is arranged outside of the coordinate input surface 2a having a rectangular shape like a picture frame; therefore, the vibration detectors 3A and 3B are arranged at diagonally opposite corners of the outer frame 20. It is preferable to use microphones as the vibration detectors 3A and 3B, which are arranged in proximity to the diagonally opposite corners of the coordinate input surface 2a of the board 2.

When the user brings a position input member such as a pen in contact with an arbitrary input position 2b on the coordinate input surface 2a, an impact occurs to cause a sound, which is detected by the vibration detectors 3A and 3B. Detailed processing and calculations for producing coordinate information with respect to the input position 2b have been already described in conjunction with the first embodiment. In summary, the sound that is caused by the impact between the position input member and coordinate input surface 2a at the input position 2b is picked up by the vibration detectors 3A and 3B, which in turn output analog vibration detection signals. The analog vibration detection signals are forwarded to the A/D converters 5A and 5B via the buffer amplifiers 4A and 4B, wherein they are subjected to analog-to-digital conversion to produce digital vibration detection signals. The difference calculation block 6 inputs the digital vibration detection signals to produce a time difference therebetween. Based on the time difference, the coordinate calculation block 7 produces one-dimensional coordinate with respect to the input position 2b. The one-dimensional coordinate of the input position 2b calculated by the coordinate calculation block 7 is subjected to the prescribed processing in the CPU 8. Thus, the CPU 8 produces a processed signal, which is converted to a display signal of a prescribed format by the display controller 9. The display signal is supplied to the display 1, which indicates the input position 2b as its one-dimensional coordinate. The user is capable of viewing the displayed position on the screen of the display 1 through the transparent board 2.

The present embodiment does not require a specially designed position input member such as an electronic pen having a specific structure, which was conventionally used. That is, the normal pen or fingernail may sufficiently satisfy the function of the position input member used for the present embodiment. In addition, the present embodiment does not require electrodes, which were conventionally required in the coordinate input devices of the resistance film method, electrostatic capacitance method, and the like. Therefore, the present embodiment could yield similar effects of the foregoing embodiments; that is, it provides a coordinate input device that is easy to operate, inexpensive, and highly reliable in coordinate input operations with a simple configuration.

Eleventh Embodiment

Figure 12:
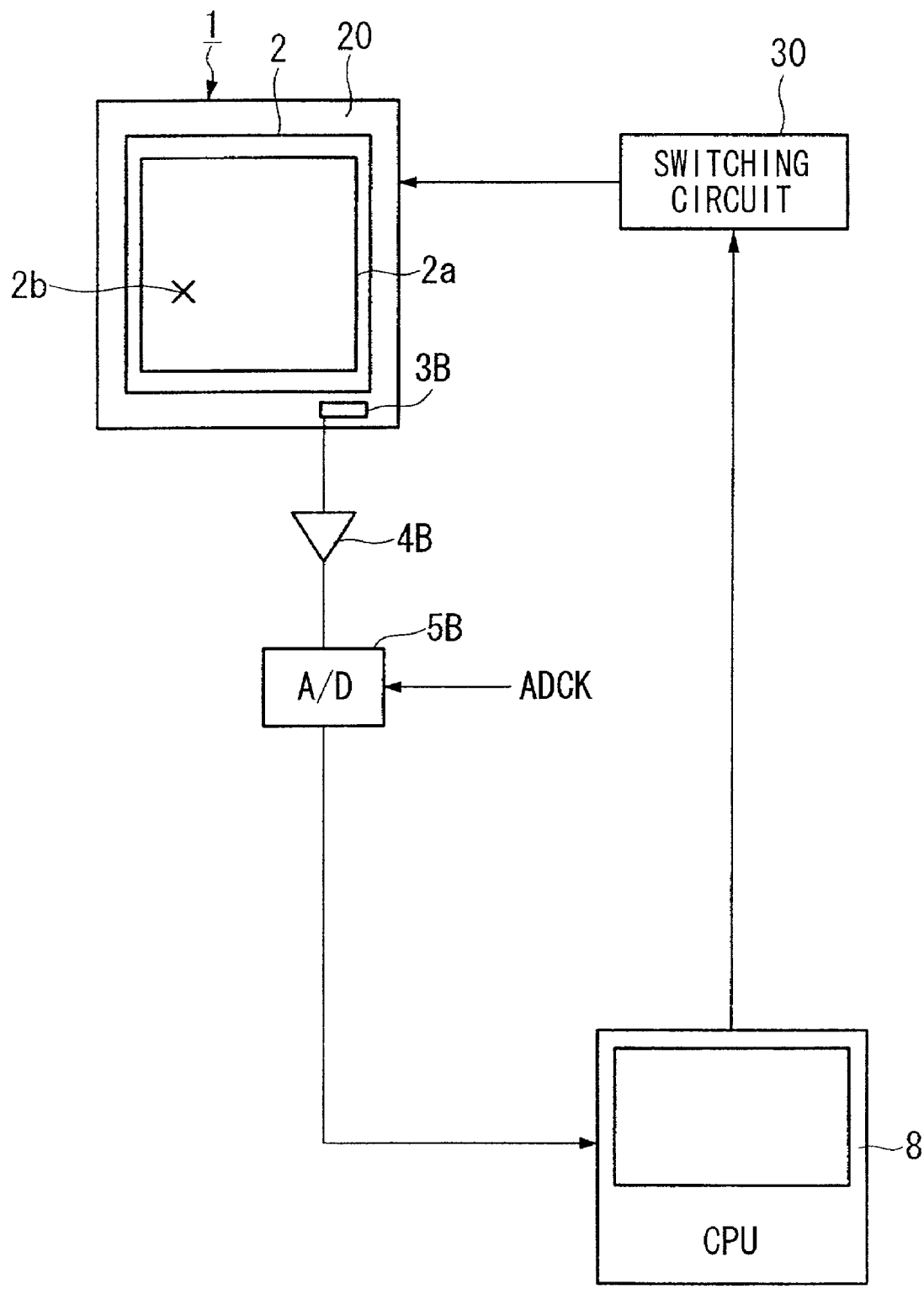
FIG. 12 is a block diagram showing a display system using a coordinate input device in accordance with an eleventh embodiment of the invention.

FIG. 12 shows an overall display system using a coordinate input device in accordance with an eleventh embodiment of the invention. The eleventh embodiment designates a composite-type PDA device that incorporates a liquid crystal display similar to the ninth embodiment shown in FIG. 10. In FIG. 12, parts identical to those shown in FIG. 11 are designated by the same reference numerals.

The first to tenth embodiments are designed to input coordinates in response to vibration that occurs when a position input member is brought in contact with a board 2. The eleventh embodiment is designed to switch over functions of the liquid crystal display in response to vibration that occurs when a position input member is brought in contact with the board 2.

In FIG. 12, an outer frame 20 of the body (or casing) of the device is arranged outside of the coordinate input surface 2a of the board 2 of the display 1. Herein, a single vibration detector 3B is arranged at the prescribed corner of the outer frame 20. Two or more vibration detectors may be required for inputting coordinates of the input position 2b on the coordinate input surface 2a of the board 2. However, the present embodiment requires a single vibration detector in order to switch over functions or images of the liquid crystal display. In addition, the single vibration detector 3B is merely arranged at the periphery of the board 2 or at an arbitrary position on the board 2. As the vibration detector 3B, it is possible to use a microphone, for example. Alternatively, it is possible to use a piezoelectric element or the like, which is arranged on the board 2.

The present embodiment uses the vibration detector 3B to detect vibration or sound that occurs when the position input member such as a pen is brought into contact with the input position 2b on the coordinate input surface 2a of the board 2. That is, the vibration detector 3B detects vibration or sound to produce an analog vibration detection signal, which is forwarded to the A/D converter 5B via the buffer amplifier 4B, wherein the analog vibration detection signal is subjected to analog-to-digital conversion to produce a digital vibration detection signal. The digital vibration detection signal is subjected to prescribed processing in the CPU 8, which then outputs a processed signal to a switching circuit 30. The switching circuit 30 switches over functions of the display 1. For example, it switches over power on/off operations or other operations for the display 1. That is, the switching circuit 30 is capable of independently controlling power on/off operations for the display 1. Therefore, when the vibration detector 3B picks up vibration or sound under the standby condition of the electronic device whose main power switched is ON, the detected vibration or sound acts as a trigger so that the switching circuit 30 automatically turns on the display 1.

The present embodiment can realize switching operations such as on/off controls of the display 1 in addition to coordinate input operations by substantially the same configuration, wherein the detected vibration or sound is used as a trigger. Since the present embodiment can perform on/off controls of the display 1, the electronic device that is currently placed in the standby state in the non-use mode can be easily turned on by merely bringing the position input member into contact with the board 2. Therefore, the present embodiment contributes to low electric power consumption for the electronic device, and it also provides good performability in manipulation.

As described heretofore, this invention provides a variety of effects and technical features, which will be described below.

(1) The coordinate input device of this invention uses vibration detectors, which is arranged on the board or in the periphery of the board, to detect vibration that is caused by an impact between a position input member and the board when the user brings the position input member such as a pen and fingernail in contact with the board at an arbitrary input position. Herein, the vibration detectors generate vibration detection signals, based on which a vibration occurrence position, namely the input position on the board, can be specified. This invention does not require an electronic pen having a special structure that incorporates a vibrator, which was conventionally used. In addition, this invention does not require electrodes for the purpose of detection of touches or contacts on the board. Therefore, the coordinate input device of this invention allows the user to input coordinates by a simple operation. Additionally, this invention can provide an inexpensive and highly reliable electronic device having a simple configuration for coordinate input operations.

(2) The coordinate input device of this invention provides simple calculations for the determination of the vibration occurrence position on the board based on the time difference that is detected between the vibration detection signals respectively output from the vibration detectors. Therefore, it is possible to speedily and reliably specify the input position by simple calculations.

(3) The coordinate input device of this invention provides a coordinate input surface roughly having a rectangular shape on the board. Two vibration detectors are respectively arranged along with two opposite sides of the coordinate input surface. That is, prescribed calculations are performed based on two vibration detection signals to specify a vibration occurrence position on the coordinate input surface as one-dimensional coordinate.

(4) It is possible to provide three vibration detectors in proximity to three corners of the coordinate input surface. Herein, prescribed calculations are performed based on three vibration detection signals to specify a vibration occurrence position on the coordinate input surface as two-dimensional coordinates.

(5) The surface of the board is not necessarily made planar or flat. That is, it is possible to provide irregularities such as projections on the surface of the board. When the position input member is brought into contact with the surface of the board, vibration occurs to allow detection of a vibration occurrence position on the board. In addition, when the user moves the position input member continuously in contact with the surface of the board, the tip of the position input member sequentially comes in contact with the projections to cause a series of small vibrations, based on which a track or locus of the movement of the position input member can be detected. That is, this invention allows the user to write characters or draw figures or curves on the board having the projections.

(6) The vibration detectors respectively located at different position of the board produce vibration detection signals having different levels. The prescribed calculations are performed for various vibration levels based on the vibration detection signals with respect to vibration occurrence positions. That is, this invention can detect the intensity (or write-down pressure) that the user applies onto the board by the position input member such as a pen. Thus, it is possible to arbitrarily change over the thickness, color, or shade in writing characters or drawing figures or curves in response to the intensity applied to the board.

(7) As the position input member, it is possible to employ a simple structure such as a sharpened tip of a pen without requiring a special structure that was conventionally required. Therefore, the coordinate input device of this invention realizes simple coordinate input operations as well as the cost reduction and downsizing of an electronic device therefor.

(8) This invention realizes coordinate input operations and other operations such as switching operations with substantially the same configuration. That is, it is possible to provide a switching circuit that is activated upon detection of vibration or sound on the board to switch over functions (e.g., power on/off controls) of the display. For example, when the user brings the position input member into contact with the board installed in the electronic device that is presently placed in the standby state, the display is automatically turned on to display the prescribed image or message thereon.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A coordinate input device for inputting coordinates on a screen of a display, comprising:
   a board providing a coordinate input surface;
   a plurality of vibration detectors that are arranged on the board or in a periphery of the coordinate input surface, wherein each of the vibration detectors detects vibration or sound that occurs when a position input member is brought into contact with the coordinate input surface of the board at an arbitrary input position, the vibration detectors each outputting a vibration detection signal at a timing corresponding to the detection of the vibration or sound;

a time difference determiner that determines a time difference between timing of a vibration detection signal from one of the vibration detectors and timing of a vibration detection signal from another of the vibration detectors; and a calculation device that performs calculations based on the time difference determined by the time difference determiner in order to determine the input position at which the vibration occurs on the coordinate input surface of the board.

2. A coordinate input device according to claim 1, the coordinate input surface of the board having a substantially rectangular shape so that two vibration detectors are arranged along with opposite sides of the coordinate input surface, and the calculation device producing one-dimensional coordinate based on two vibration detection signals respectively output from the two vibration detectors as a representation of the input position on the coordinate input surface of the board.

3. A coordinate input device according to claim 1, the coordinate input surface of the board having a substantially rectangular shape so that three vibration detectors are arranged in proximity to three corners of the coordinate input surface, and the calculation device producing two-dimensional coordinates based on three vibration detection signals respectively output from the three vibration detectors as a representation of the input position on the coordinate input surface of the board.

4. A coordinate input device according to claim 1, the calculation device producing vibration levels based on the vibration detection signals respectively output from the vibration detectors.

5. A coordinate input device for inputting coordinates on a screen of a display, comprising:

a board providing a coordinate input surface that has a substantially rectangular shape;

a plurality of vibration detectors that are arranged in proximity to prescribed corners of the coordinate input surface of the board, each of the vibration detectors detecting vibration or sound that occurs when a position input member is brought into contact with the coordinate input surface of the board at an arbitrary input position; and calculation means for performing calculations based on vibration detection signals respectively output from the plurality of vibration detectors, thus producing one-dimensional coordinate or two-dimensional coordinates as representation of the input position at which the vibration occurs on the coordinate input surface of the board, a plurality of vibration inducing projections being arranged on the coordinate input surface of the board, the vibration-inducing projections inducing vibration of the coordinate input surface when contacted by a non-vibrating position input member.

6. An electronic device comprising:

a display; and a coordinate input device that comprises a transparent board attached onto a screen of the display, the transparent board having a coordinate input surface substantially having a rectangular shape, at least one vibration detector that is arranged on the transparent board or in a periphery of the coordinate input surface, the vibration detector detecting vibration or sound generated by contact between a non-vibrating position input member and the coordinate input surface of the transparent board at an arbitrary input position, and calculation means for performing calculations based on a vibration detection signal output from the vibration detector, thus producing coordinate information as a representation of the input position at which the vibration occurs on the coordinate input surface of the transparent board, the input position being displayed on the screen of the display based on the coordinate information produced by the calculation means.

7. An electronic device according to claim 6, wherein a plurality of projections are arranged on the coordinate input surface of the transparent board.

8. An electronic device according to claim 6, wherein two vibration detectors are arranged along with opposite sides of the coordinate input surface so that the calculation means produces one-dimensional coordinate based on two vibration detection signals respectively output from the two vibration detectors as the coordinate information.

9. An electronic device according to claim 6, wherein three vibration detectors are arranged in proximity to three corners of the coordinate input surface so that the calculation means produces two-dimensional coordinates based on three vibration detection signals respectively output from the three vibration detectors as the coordinate information.

10. An electronic device according to claim 6, wherein the display is a liquid crystal display or an electroluminescent display.

11. An electronic device according to claim 6 further comprising a switching circuit for performing a prescribed switching operation in response to the vibration detection signal output from the vibration detector.

* * * * *